Figure 1:
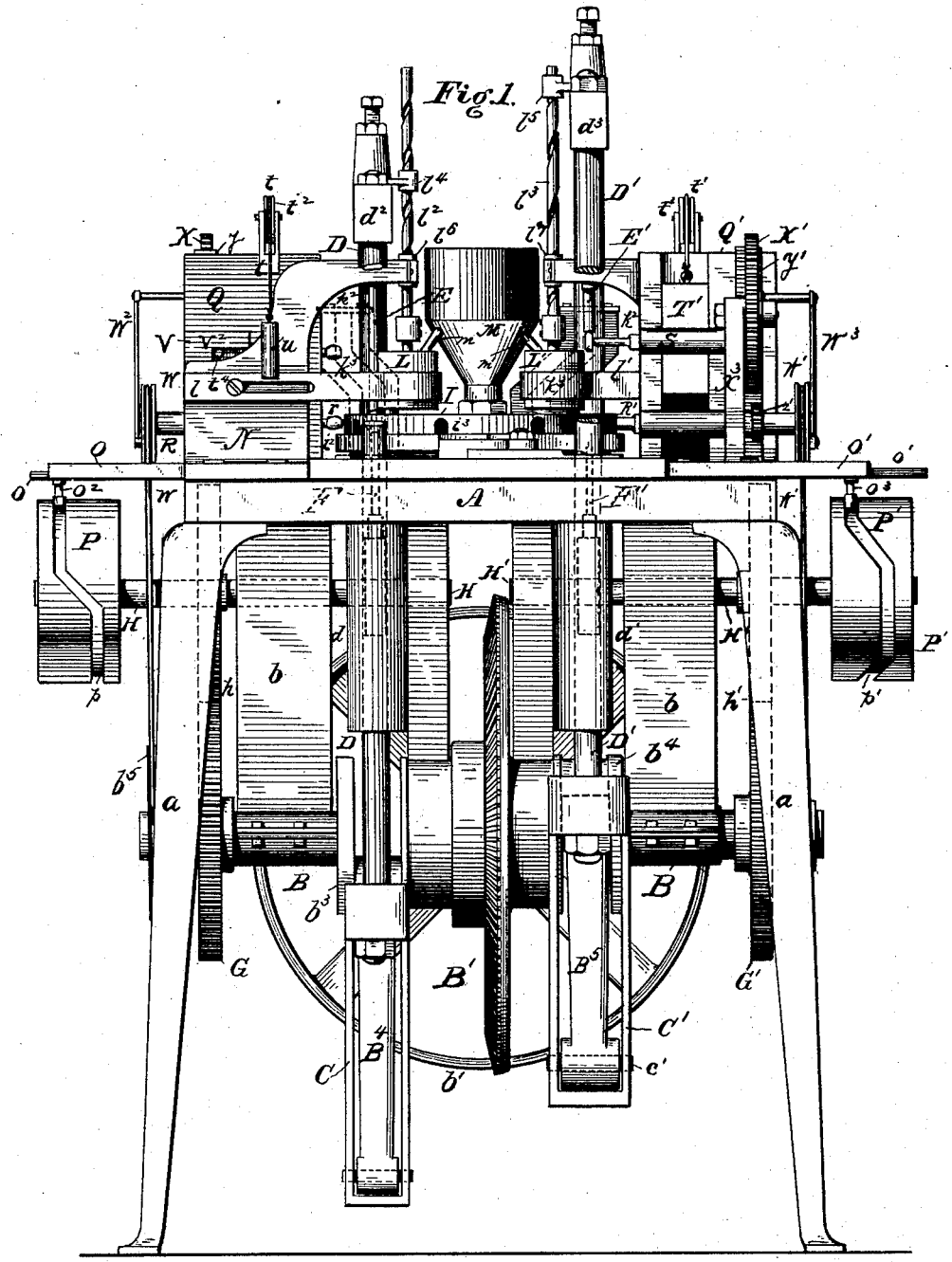

(No Model.) 6 Sheets—Sheet 1.

G. A. SMITH.
PILL AND LOZENGE MACHINE.

No. 320,447. Patented June 16, 1885.

WITNESSES: INVENTOR (No Model.) 6 Sheets—Sheet 2.
G. A. SMITH.
PILL AND LOZENGE MACHINE.

No. 320,447. Patented June 16, 1885.

WITNESSES: INVENTOR (No Model.) 6 Sheets—Sheet 3.

G. A. SMITH.
PILL AND LOZENGE MACHINE.

No. 320,447. Patented June 16, 1885.

WITNESSES: INVENTOR (No Model.) 6 Sheets—Sheet 4.

G. A. SMITH.
PILL AND LOZENGE MACHINE.

No. 320,447. Patented June 16, 1885.

WITNESSES:
A. A. Connolly
Daniel Scott

INVENTOR
Geo. A. Smith
By Connolly Bro.
Attorneys.

(No Model.) 6 Sheets—Sheet 5.

G. A. SMITH.
PILL AND LOZENGE MACHINE.

No. 320,447. Patented June 16, 1885.

WITNESSES: INVENTOR (No Model.) 6 Sheets—Sheet 6.
G. A. SMITH.
PILL AND LOZENGE MACHINE.
No. 320,447. Patented June 16, 1885.
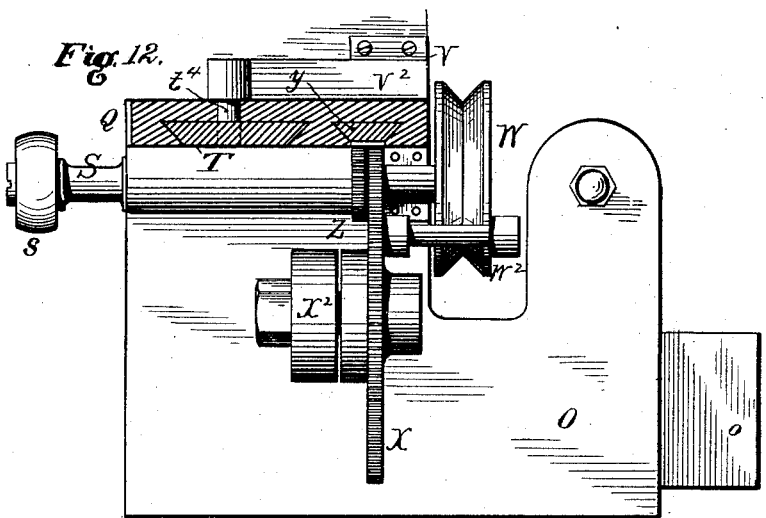
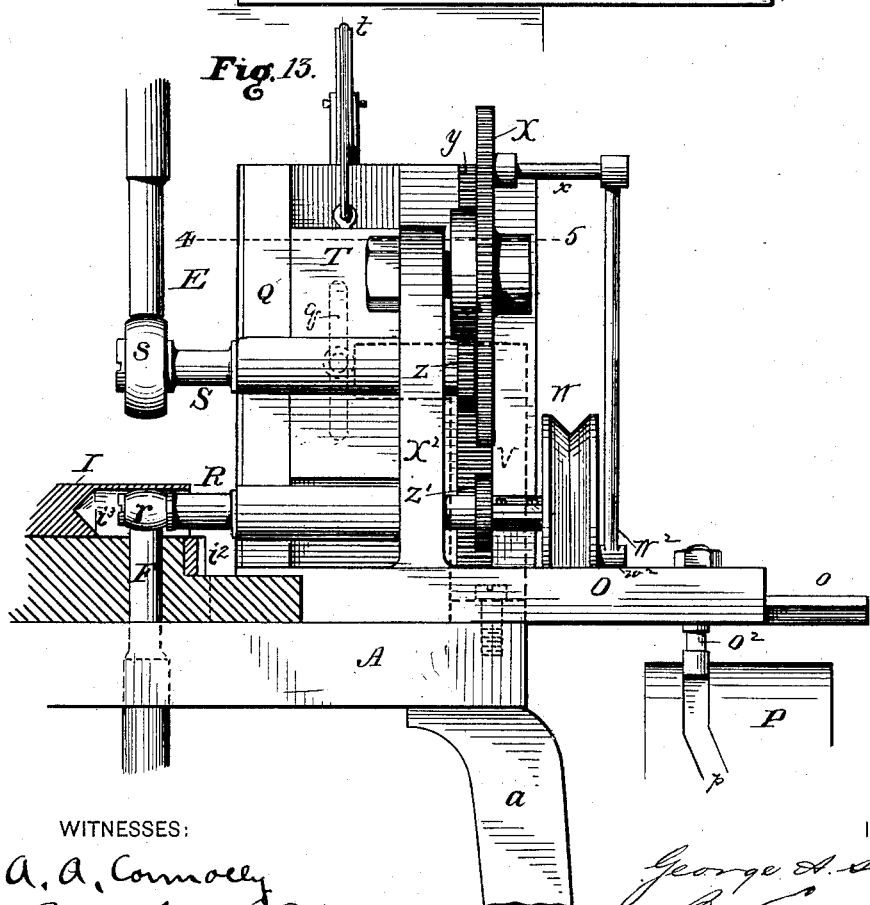
WITNESSES:
A. A. Connolly
Daniel Scott
INVENTOR
George A. Smith
By Connolly Bros.,
Attorneys.
N. PETERS, Photo-Lithographer, Washington, D. C.

UNITED STATES PATENT OFFICE.

GEORGE A. SMITH, OF NORRISTOWN, PENNSYLVANIA.

PILL AND LOZENGE MACHINE.

SPECIFICATION forming part of Letters Patent No. 320,447, dated June 16, 1885.

Application filed April 9, 1885. (No model.)

*To all whom it may concern:*

Be it known that I, GEORGE A. SMITH, a citizen of the United States, residing at Norristown, in the county of Montgomery and State of Pennsylvania, have invented certain new and useful Improvements in Pill and Lozenge Machines; and I do hereby declare the following to be a full, clear, and exact description of the invention, reference being had to the accompanying drawings, which form part of this specification.

My invention has for its object to provide a double-acting machine which shall make two pills or lozenges at every revolution of the main shaft and make them alternately, such pills or lozenges being produced by compression of powder between upper and lower dies.

My improvements consist in the peculiar construction and combinations of parts, hereinafter described and specifically claimed, having reference principally to the following points, first, to the combination, with a double-crank shaft and an intermittently-rotating matrix, of two pairs of dies operating alternately; second, an intermittently-rotating matrix having an odd number of holes, in combination with two pairs of dies, the latter being placed on opposite sides respectively of said matrix, so that one of said holes shall come in line with one pair of dies, while the other pair are aligned with the part of the matrix between two holes on the opposite side; third, an intermittently-rotating matrix having an odd number of holes, said matrix being moved by pawls engaging alternately with ratchet-teeth thereon, there being twice as many teeth as there are holes in the matrix; fourth, the combination, with the matrix and lower dies, of mechanism for wiping or cleaning the latter below the surface of the former; fifth, the combination, with the matrix, of novel means for securing its intermittent rotation, comprising slides carrying pawls which engage with the ratchet-teeth on the matrix, said slides supporting uprights having inclined slots, which receive rollers secured on the vertically-moving rods on which the upper dies are sustained, and through the medium of which they are moved; sixth, the novel combination of parts for effecting the wiping or cleaning of the upper dies, the same consisting of oscillating rollers on shafts, which are moved horizontally by revolving cams, said shafts being sustained on slides, which are raised vertically by means of weights or springs and lowered by the dies; seventh, the combination of the various parts which form that portion of the machine relating to the die-wiping apparatus.

Figure 2:
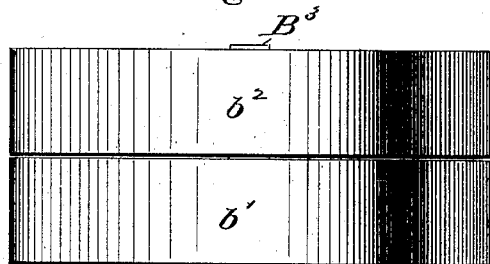
Figure 3:
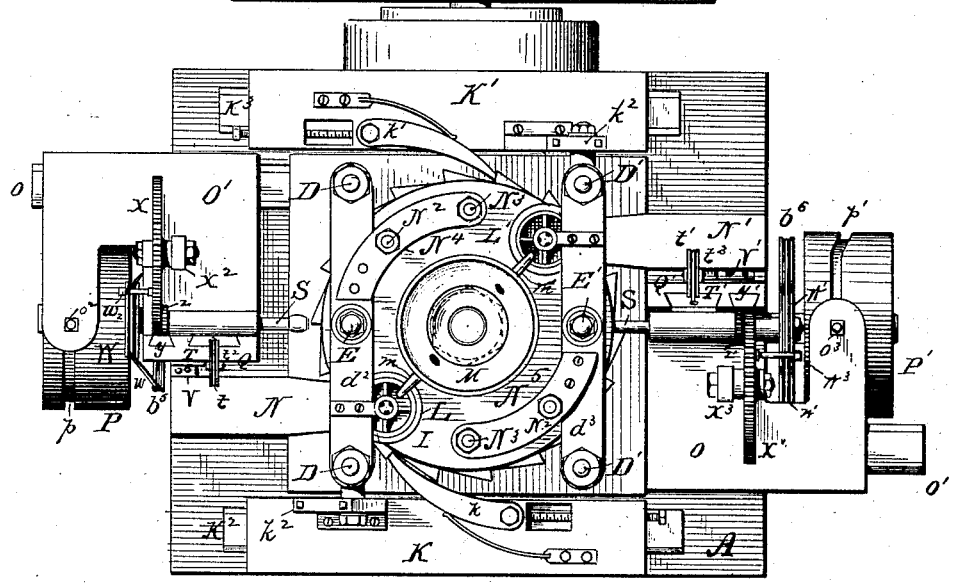
Figure 4:
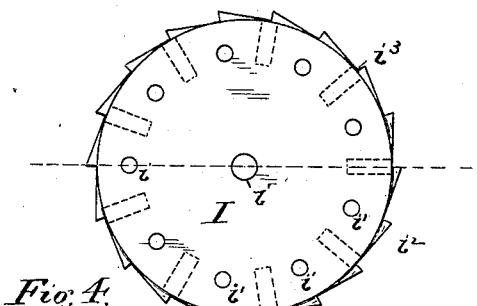
Figure 5:
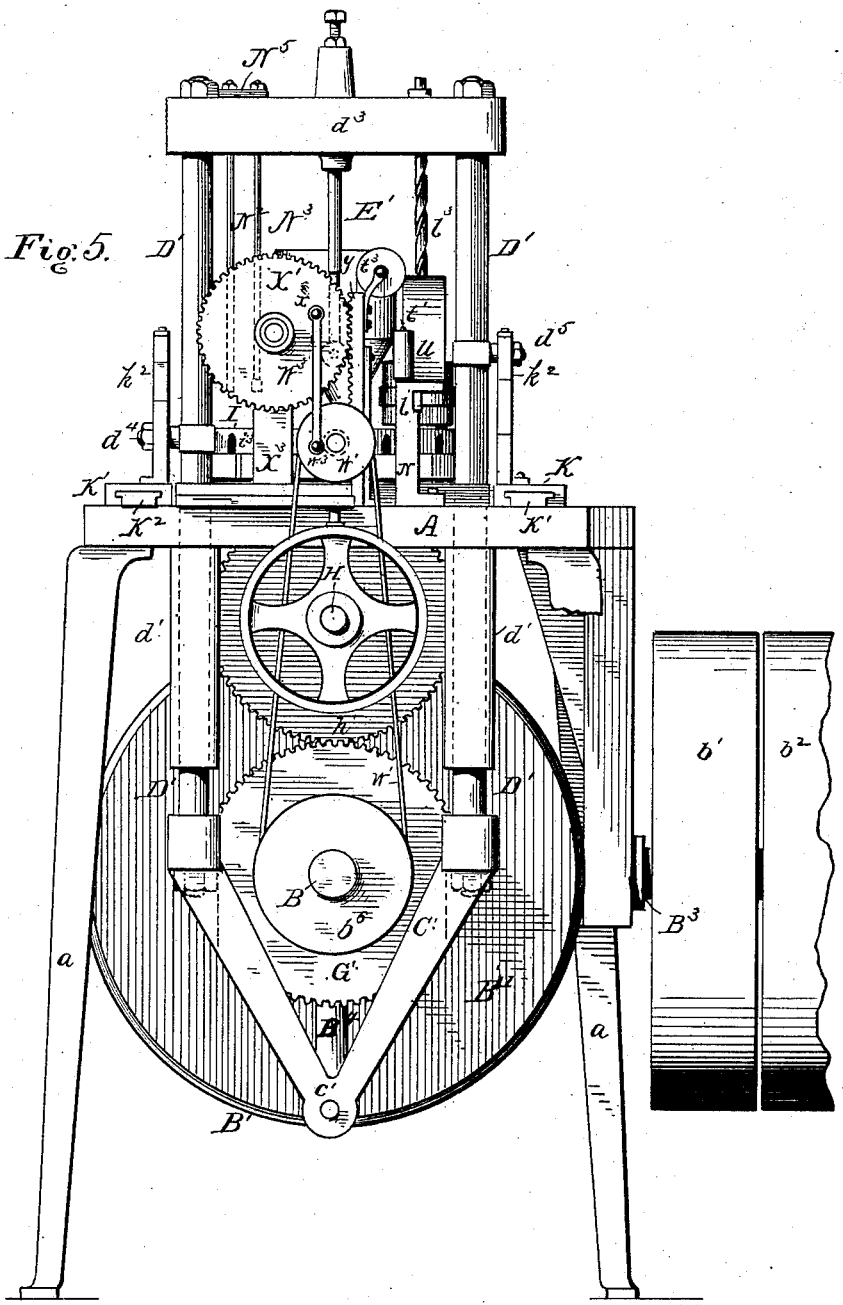
Figure 6:
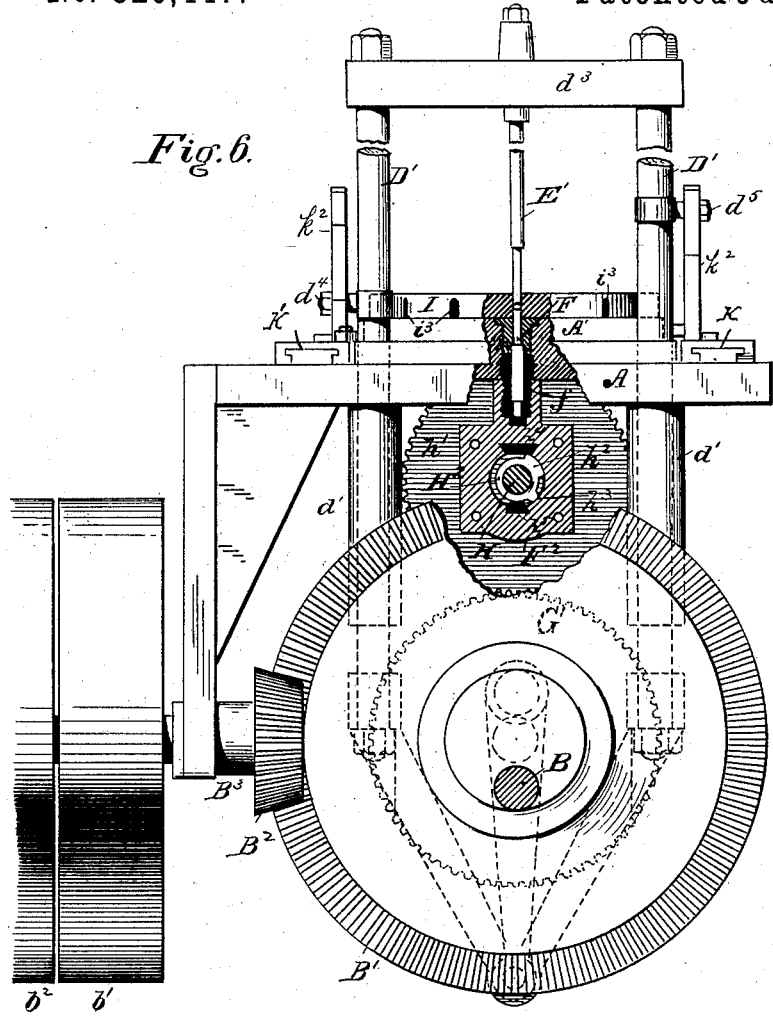
Figure 9:
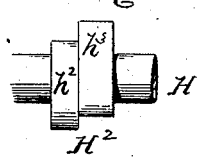
Figure 7:
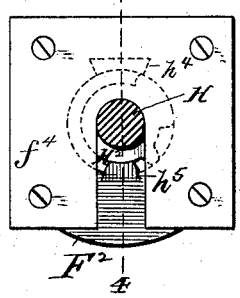
Figure 8:
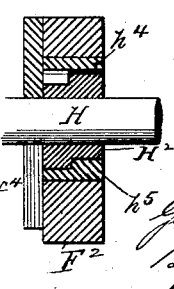
Figure 10:
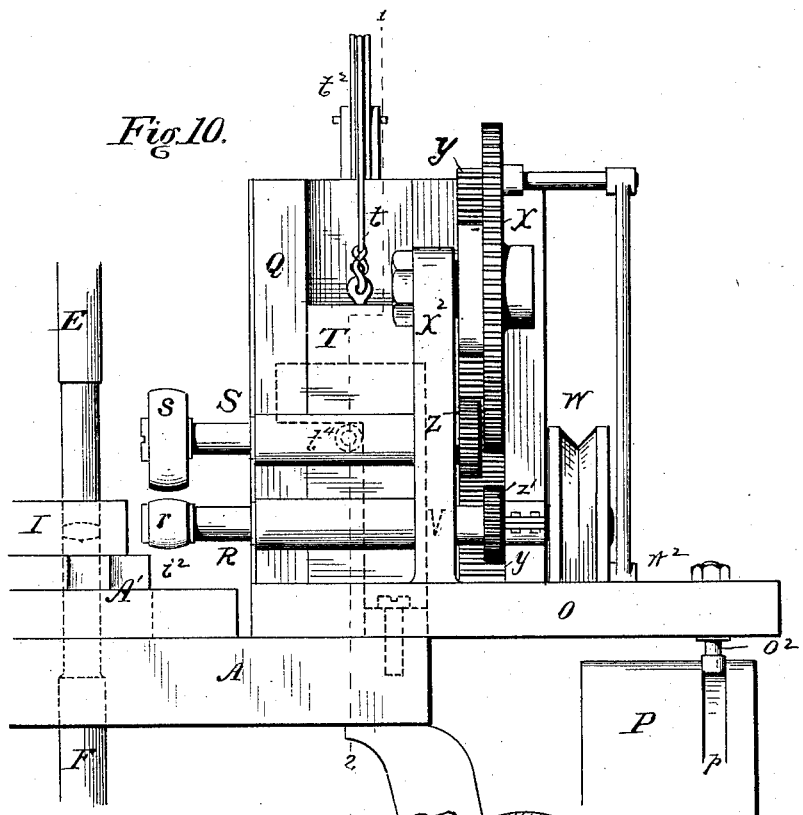
Figure 11:
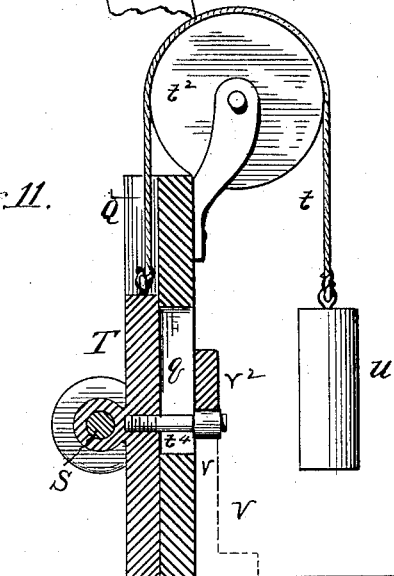

In the accompanying drawings, which illustrate my invention, Figure 1 is an elevation of the complete machine, portions of the rods being shown broken away. Fig. 2 is a plan of machine; Fig. 3, a plan of matrix; Fig. 4, a vertical section of matrix and supporting-bed. Fig. 5 is an end elevation of machine, partly broken away. Fig. 6 is a detail elevation, partly in section and partly broken away. Fig. 7 is a side elevation of mechanism for moving lower dies, showing shaft in section; and Fig. 8 is a vertical section in line 3 4 of Fig. 7, shaft being shown full. Fig. 9 is an elevation of cam-wheel shown in Figs. 7 and 8. Fig. 10 is an elevation of wiping mechanism enlarged; and Fig. 11 is a vertical section of same, taken through line 1 2, Fig. 10. Fig. 12 is a transverse section taken on line 4 5, Fig. 13, and Fig. 13 is another enlarged elevation, partly in section, of wiping mechanism.

Referring to said drawings, A indicates the table or bed-piece of the machine, supported on legs $a\ a$.

B is the main shaft, supported in hangers $b\ b$, depending from the table and revolved by bevel-gear $B'\ B^2$ from the driving-shaft $B^3$, the latter having the fast and loose pulleys $b'\ b^2$. Said main shaft is formed with two cranks, $b^3$ and $b^4$, set in opposition to each other, so that when one is up the other is down. From these cranks there proceed straps or rods $B^4\ B^5$ which connect with stirrups C C' of V form, the connection being pivotal and at the apices or points $c\ c'$. These stirrups are connected at their upper ends to the lower extremities of rods D D', fitted in guides $d\ d'$, formed on or secured to the table A, so that as the shaft B rotates said rods will be reciprocated vertically and alternately—that is, two of the rods up while the other two are down and vice versa, said rods being connected in pairs by cross-heads $d^2\ d^3$. To these cross-heads are firmly secured the upper dies, E E', whose lower ends are formed concave.

F and F¹ are the lower dies, which are in opposition to and alignment with the upper dies, and have their upper extremities formed concave, so that when said upper and lower dies meet there will be a chamber between their ends for the pill or lozenge.

To communicate vertically-reciprocating movements to the lower dies, F F', the following construction is provided: On the crank-shaft B are two gear-wheels, G and G', which are in mesh with two pinions, $h$ $h'$, on shafts H H', located above said crank-shaft and supported in hangers on the under side of the table A. On each of said shafts H H' is a cam-wheel, H² having two cams, $h^2$ $h^3$. Each of the lower dies is made fast by means of a nut, $f$, in a block or stock, F², the latter having passages for the shafts H H', and to permit their being moved vertically by the cam H². Steel shoes $h^4$ $h^5$ are inserted in the stocks to avoid wear of the cams. As the shafts H H' rotate, the cams $h^2$ meet the shoes $h^4$ and elevate the stocks F² with their dies, said stocks and dies being drawn downwardly when the cams $h^3$ meet the shoes $h^5$, the movement of the dies being alternate—that is, one up while the other is down. Face-plates or yokes $f^4$ are screwed on or fastened to the stocks F², and the latter are guided by the stems of the dies which pass through bushings $a'$ in a steel ring or disk A', on the table A. The cam $h^2$ on each cam-wheel is in a different plane from the cam $h^3$, so that the former will not meet the shoe $h^5$, nor the cam $h^3$ the shoe $h^4$.

I is the matrix in which the pills are formed, and it consists of a disk which rests centrally upon the table A, and has a central opening, $i$, for the reception of a boss or other suitable axis of rotation on said table. Said matrix has holes $i'$ $i'$, which receive the charges of powder compressed by the dies E F. There is an odd number of holes, so that when a hole is in alignment with one pair of dies on one side of the table the other pair of dies on the directly opposite side of the table will be over the solid portion of the matrix between two of the holes. To communicate an intermittent rotation to said matrix of such extent at each impulse that the holes therein shall be alternately brought into alignment with the dies on the opposite sides thereof—i. e., first a hole with a pair of dies on one side and then a hole with pair of dies on the opposite side of the table—said matrix should be moved at each impulse a space equal to half the distance between the holes. To effect this the matrix or disk is formed with ratchet-teeth $i^2$ $i^2$ on its periphery, there being an even number of such teeth, which number is exactly double the number of holes in the disk.

K K' are parallel slides on opposite sides of the matrix, carrying pawls $k$ $k'$, which engage with the ratchet-teeth on the latter. These slides fit on guides or ways K² K³ on the table A, and are reciprocated longitudinally by the following means: On each slide is an upright, $k^2$, having a slot, $k^3$, the upper and lower parts of which are vertical, the middle part or portion between the upper and lower parts being an incline. On one rod of each pair of rods D D' is a projection or stud, $d^4$ $d^5$, carrying an antifriction roller, which is entered to the slot $k^3$. In the ascent and descent of the rods the rollers ride on and press against the inclined sides of the slots, and so impart movement to the slides, which latter move in the same direction simultaneously. As one pawl moves and pushes the disk forwardly while the other pawl is retreating, and as the advancing pawl moves said disk the length of a tooth, it follows that the retreating pawl moves past two teeth—that is, it moves the length of one tooth and the disk moves past it the length of another tooth; hence each pawl, separately considered, engages with alternate teeth of the disk or matrix.

L L' are two charging-boxes for supplying the powder to the holes in the matrix. These boxes are fed by pipes or spouts $m$ $m'$, communicating with a centrally-located hopper, M, the upper ends of said pipes being connected to the hopper and dipping into the boxes L L'. Said boxes are supported over the matrix and near the edge thereof in brackets $l$ $l'$, rigidly connected to uprights N N', fastened to the bed A, and have each a spout on their bottom, to one side of the center of said bottom and in line with a circle passing through all the holes in the matrix. These boxes are fitted so they can be rotated on their vertical axes in order that the spouts in their bottoms may either register wholly or partly with the matrix holes, so as to permit a variation in the volume of the charges of powder which they deliver to the matrix holes. There are stirrers in the charging-boxes having radial floats and screw-threaded or spiral stems $l^2$ $l^3$, with which engage nuts $l^4$ $l^5$ in brackets on the cross-heads $d^2$ $d^3$, said stems being supported in bearings $l^6$ $l^7$ in brackets secured to the standards N N', in order that when the cross-heads move up and down an oscillating motion may be communicated to said stirrers.

N² N³ are rods secured to brackets N⁴ N⁵, fastened to the cross-heads $d^2$ $d^3$, and operating, respectively, as ejecting-plungers for the pills or lozenges, and as wipers for the vertical holes in the matrix.

To wipe or clean both the upper and the lower dies the following construction is provided:

O O' represent slides supported on the table A, and movable on guides or ways $o$ $o'$ thereon. These slides have each a depending stud, $o^2$ $o^3$, with anti-friction rollers, which enter cam-grooves $p$ $p'$ in wheels P P', fastened on the shafts H H', so that as said shafts rotate said slides will be reciprocated alternately toward and from the center of the matrix. On these slides are standards Q Q', which afford supports for horizontal shafts R R', which have at their inner ends rollers or heads $r\ r$, covered with chamois-skin or other equivalent or suitable material; or said heads may be brushes. Said shafts are in line horizontally with the edge of the matrix, and the latter has radial openings or slots $i^3\ i^3$, which alternate, as shown in Fig. 3, with the vertical holes $i'\ i'$ therein. By reason of the reciprocating movements of the slides O O' the shafts R R' are alternately caused to enter the radial slots in the matrix and bring their heads into contact with the upper ends of the lower dies and to clean or wipe the same, an oscillating motion being communicated to said shafts, as hereinafter set forth.

S S' are other shafts having wiping-heads or brushes $s\ s'$ like those on the shafts R R', though preferably of larger diameter. These shafts have their bearings on blocks T T', which are fitted in dovetail grooves or guides in the standards Q Q', so as to be capable of being moved vertically therein. The blocks T T' are connected by cords $t\ t'$ with weights U U', said cords passing over pulleys $t^2\ t^3$ on the standards Q Q'. The tendency of the weights is to constantly draw up the blocks T T' and elevate the shafts S S'; but this tendency is resisted when the slides O O' are in any but their most inward position (such position being shown in Fig. 13) by the following means: Back of the standards Q Q' are $\Gamma$-shaped standards V V', consisting of vertical posts $v\ v'$, secured fixedly to the bed-plate or table A, and having the horizontal arms or projections $v^2$. From the blocks or slides T T' there project studs $t^4\ t^4$, which pass through slots $q\ q'$ in the standards Q Q', and carry anti-friction rollers which come beneath the arms $v^2\ v^2$. When the slides O O' are drawn outwardly, as shown in Fig. 10, the rollers $t^4\ t^4$ come beneath the arms $v^2\ v^2$, and so prevent the slides T T' from moving upwardly; but when the slides O O' are pushed into the position shown in Fig. 13, the rollers $t^4\ t^4$ clear the ends of the arms $v^2\ v^2$, and said slides T T' being then free to move, are drawn upwardly by the weights U U'. This elevates the shafts S S' and brings their heads into contact with the upper dies, which are then in their raised position, as shown in Fig. 13, the dies E E' as they descend pushing down the wipers or cleaners before them, and the raising and lowering of said shafts being alternate and in keeping with the movement of the dies, one pair of dies being cleaned or wiped while the other pair is compressing and forming a pill or lozenge.

To communicate the oscillatory movement to the wipers or cleaners, the following construction is provided: On the shafts R R' (or on independent shafts, if desired) are loose pulleys W W', connected by belts $w\ w'$ with pulleys $b^5\ b^6$, fast on the crank-shaft B. From the crank-pins $w^2\ w^3$ on said pulleys W W' there extend pitmen $W^2\ W^3$, connecting with crank-pins $x\ x'$ on gear-wheels X X', supported on standards $X^2\ X^3$, fastened at their bases to the slides O O'. The wheels X X' are in gear with racks $y\ y'$, formed on dovetailed slides Y Y', fitted and adapted to move vertically in grooves in the standards Q Q', so that vertically-reciprocating movements are communicated to said racks. In gear with these racks are pinions $z\ z'$ on the wiper-shafts R R' S S', so that an oscillating movement is communicated to said shafts.

In operation the main shaft revolves and effects a vertical reciprocating movement of each pair of dies, and forms two pills or lozenges at each revolution. The charging-boxes being in advance of the dies, the vertical holes in the matrix are charged successively before coming into alignment with the dies. After a pill or lozenge is formed, the dies pass out of the matrix, and the latter is revolved sufficiently to bring a hole in line with the dies on the opposite side. Whenever the upper dies descend, the plungers $N^2\ N^3$ also move downwardly, the plunger $N^2$ ejecting the just formed pill or lozenge from the matrix through a registering-hole in the table A, and the plunger $N^3$ wiping the next hole, from which a pill or lozenge was previously ejected. While the dies are out of the matrix, they are cleaned or wiped by the mechanism described, one pair of dies being cleaned while the other pair are compressing.

What I claim as my invention is—

1. In a machine for forming pills or lozenges, the combination, with a double-crank shaft and intermittently-rotating matrix, of two pairs of dies operating alternately, substantially as shown and described.

2. In a machine for forming pills or lozenges by compression, the combination, with two pairs of dies, of an intermittently-rotating matrix having an odd number of holes for the entrance of said dies, substantially as shown and described.

3. In a machine for forming pills or lozenges by compression, the combination, with a matrix having an odd number of holes for the dies, and having twice as many ratchet-teeth as holes, of reciprocating slides on opposite sides of said matrix, carrying pawls which alternately engage with said ratchet-teeth and impart an intermittent rotation to said matrix, substantially as shown and described.

4. In a machine for forming pills or lozenges by compression, and having upper and lower dies between which said pills or lozenges are formed, and a matrix in which said dies operate, the combination, with the lower die, of a wiper or cleaner operating on said lower die below the upper surface of said matrix, substantially as shown and described.

5. In a machine for forming pills or lozenges by compression, and having a lower die which compresses upwardly, the combination, with said die and a matrix having radial slots or mortises, of a wiper or cleaner which reciprocates in and out of said radial openings and cleans or wipes the die, substantially as shown and described.

6. In a machine for forming pills or lozenges by compression, and having a matrix intermittently rotated by slides, carrying pawls which engage with ratchet-teeth on said matrix, and having dies which reciprocate vertically, the combination, with said slides and the rods on which said dies are supported, of standards on said slides having inclined slots and rollers carried on said rods, which move in said slots, whereby said slides are moved from said rods, substantially as shown and described.

7. In a machine for forming pills or lozenges by compression, the combination, with a vertically-moving upper die, of a horizontally reciprocating and oscillating shaft carrying a wiper or brush, said shaft being sustained on a slide which is drawn upwardly by a weight and moved downwardly by the die, substantially as shown and described.

8. In combination with the upper and lower dies of a machine for forming pills or lozenges by compression, the mechanism for wiping or cleaning said dies, comprising the reciprocating slide O, shafts R S, weighted slide T, pulley W, pitman $W^2$, wheel X, sliding rack Y, and pinions $z\ z'$, said several parts being constructed and combined for operation substantially as shown and described.

In testimony that I claim the foregoing I have hereunto set my hand this 1st day of April, 1885.                GEORGE A. SMITH.

Witnesses:
 ANDREW ZANE, Jr.,
 WILL H. POWELL.